United States Patent [19]

Zweig et al.

[11] 4,309,575

[45] Jan. 5, 1982

[54] APPARATUS FOR INTERCRANIAL TRANSMISSION OF AUDIO SIGNALS

[75] Inventors: Richard L. Zweig, Huntington Beach; Jack Schaefer, Brea; Daniel G. Frank, Thousand Oaks, all of Calif.

[73] Assignee: Therapeople, Inc., Whittier, Calif.

[21] Appl. No.: 117,749

[22] Filed: Feb. 1, 1980

[51] Int. Cl.³ ........................ H04M 1/05; H04R 25/00

[52] U.S. Cl. ........................... 179/107 BC; 179/156 R

[58] Field of Search ........ 179/107 BC, 156 R, 121 C, 179/121 T

[56] References Cited

U.S. PATENT DOCUMENTS

| | | | |
|---|---|---|---|
| 1,531,543 | 3/1925 | Cooper | 179/107 BC |
| 1,730,761 | 10/1929 | French | 179/107 BC |
| 2,652,457 | 9/1953 | Knowles | 179/156 R |
| 3,134,861 | 5/1964 | Dempsey et al. | 179/156 R |

FOREIGN PATENT DOCUMENTS

| | | | |
|---|---|---|---|
| 672722 | 5/1952 | United Kingdom | 179/107 BC |

*Primary Examiner*—George G. Stellar
*Attorney, Agent, or Firm*—Warren T. Jessup

[57] ABSTRACT

An apparatus for intercranial transmission of a plurality of audio signals in which a pair of transducers are independently mounted on a headband for transmitting audio signals from a source to the cranium. The apparatus is comprised of two parallel wires having earmuffs attached to each end which fit over the ears to eliminate external stimuli. The transducer assemblies are adjustably mounted on the wire headband for sliding adjustment to different positions. The transducer assemblies each include separately oscillatable transducers which are insulated from external stimuli and from each other. A stereophonic plug is provided for connecting the independent transducer assembly to a stereophonic audio signal source.

18 Claims, 7 Drawing Figures

APPARATUS FOR INTERCRANIAL TRANSMISSION OF AUDIO SIGNALS

BACKGROUND OF THE INVENTION

This invention relates to devices for testing and aiding in the hearing of persons having impaired or damaged hearing systems.

Normally, auditory perception or heating is achieved in a human being by having external soundwaves in the air causing corresponding sequential movement of the ear drum membrane, the middle ear stirrup, the inner ear membrane and the fluid in the inner ear, where the movement is detected by the ends of the auditory nerve and transmitted to the brain. Each acts independently of the other and is individually connected to the opposing hemisphere of the brain. Stimuli in the form of nerve impulses perceived by the brain from both auditory nerves is interpreted and correlated as varying noises and tones. However, if the ear drum or other physical components within the normal hearing system are damaged, normal auditory perception is impaired or prevented.

To assist those who have such damaged or impaired hearing, various devices have been proposed and manufactured. One such device provides transmission of audio signals by electrical stimulation of the facial nerve system. This device operates on the principle of transmitting electrically induced audio signals to the facial nerve system which is associated with the inner ear mechanism of the body, such that the signals are transmitted to the hearing centers of the brain. Another device utilizes transmission of sound information to the brain directly through the individual's cranial bone structure, to stimulate the cranial activity to transmit the signals from a source to the brain receptors. Such a device is disclosed and described in U.S. patent application Ser. No. 37,809, filed on May 10, 1979, by the inventors of the device disclosed and described herein.

This device and other prior art devices, while effective, do not provide for intercranial transmission of dual, simultaneous signal sources to test and determine the existence and extent of physical damage to the normal hearing system. Further, none of the prior art systems provides any means to transmit two separate sound signals simultaneously to the brain through the intercranial structure with minimal interference with each other.

SUMMARY OF THE INVENTION

The purpose of the present invention is to provide an intercranial transmission system whereby two separate sound signals may be transmitted simultaneously to the brain with minimal interference with each other.

The present invention employs two electro-mechanical transducers to introduce mutually exclusive vibrations directly to the cranial structure of a human being, which in turn cause vibratile motion of the inner ear fluid surrounding the auditory nerve receptors and is subsequently converted to electrical energy and transmitted as nerve impulses to the brain where it is perceived as sound. The invention employs two electromechanical transducer assemblies independently mounted on a headband constructed of two parallel wires. Attached to each end of the wires are earmuffs to support the assembly on the head, while excluding external stimuli by fitting over the ear. The transducer assemblies are slideably mounted for adjustment on the parallel wires by foam insulation in the transducer assembly housing through which the parallel wires pass. The parallel wires of the headband are compressed between resilient foam pads in the transducer assembly to slide freely on the wire headbands and prevent contact of the wire headbands with the transducer assembly housings.

Each transducer assembly has an oscillatable transducer supported in a manner which permits the transducer to have its face pressed against the cranium when the headband is worn. Each transducer assembly supports the transducer in a complete sound-insulating relationship. The oscillatable transducers themselves are constructed in accordance with the principles taught in U.S. patent application Ser. No. 37,809, filed May 10, 1979 by the inventors of the invention disclosed herein.

The oscillatable transducers in each transducer assembly are connected to a stereophonic plug for simultaneous application of separate sound signals. The stereophonic plug is connected to the transducer assemblies through a junction box attached to and spanning the headband wires which also assists in maintaining spacing of the wires.

Thus, it is one object of the present invention to provide an intercranial transmitting apparatus comprised of a pair of transducer assemblies mounted on a headband which are completely insulated from each other.

Another object of the invention is to provide an intercranial transmitter apparatus for use as a diagnostic tool for determining the existence and the extent of physical damage to the normal hearing system.

Yet another object of the present invention is to provide intercranial transmitting apparatus which permits a substitute means of transmitting equivalent sound signal to the brain of persons who have experienced damage to the physical components within the normal hearing system.

Yet another object of the present invention is to provide an intercranial transmitting apparatus in which two separate sound signals may be transmitted simultaneously to the brain with minimal interference with each other.

Other objects and advantages and novel features of the invention become apparent from the following detailed description of the invention when considered in conjunction with the accompanying drawings, wherein like reference numbers identify like parts throughout.

DETAILED DESCRIPTION OF THE PREFERRED EMBODIMENT

Figure 1:
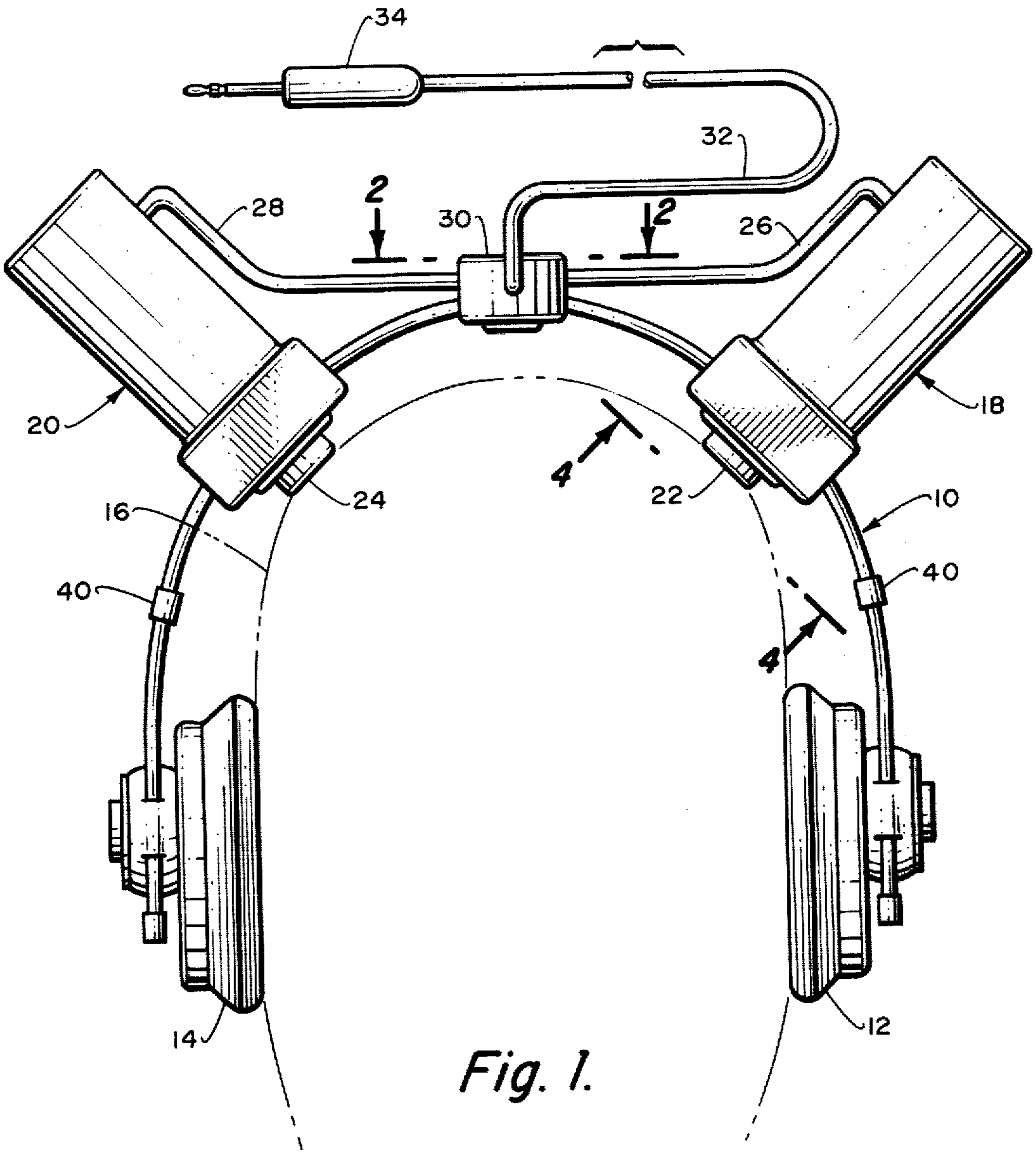
FIG. 1 is a front elevation of an intercranial transmitting apparatus constructed according to the invention.
Figure 2:
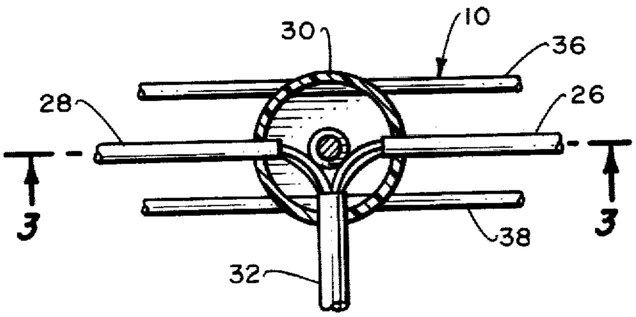
FIG. 2 is a sectional view taken at 2—2 of FIG. 1.

Referring to FIG. 1, there is shown an intercranial transmitting apparatus comprised of a headband 10 having earmuffs 12 and 14 attached at each end for mounting on the head of a wearer, indicated by the phantom line at 16. Two slideably adjustable transducer assemblies 18 and 20 are supported by the headband with oscillatable transducers 22 and 24 having their respective faces in contact with the cranium as shown. The transducer assemblies are connected by means of cables 26 and 28 to a junction box 30, spanning the headband 10. The junction box 30 is in turn connected by a cable 32 to a stereophonic plug 34 for connecting the transducer assembly to an external source of sound signals.

The transducer assemblies 18 and 20 are independently mounted on the headband 10, consisting of two parallel wires 36 and 38 which are conformed to firmly fit the skull or head 16. Spacers 40 maintain the spacing of the parallel wires 36 and 38 in conjunction with the junction box 30 spanning the headband 10. The earmuffs 12 and 14 are adapted to completely cover the ears to prevent additional external sound stimuli from activating the normal hearing circuit and create dischordinate sound patterns when the transducers are activated. The transducer assemblies are separately connected through the junction box 30 by the cables 26 and 28 which connect to the cable 32 to which the stereophonic plug 34 is attached.

The respective transducer assemblies 18 and 20 are independently supported on the headband as illustrated in FIGS. 4 through 7. The primary problem with a device of this nature is to prevent any vibration from one transducer being conducted and intermixed with any vibration from the other transducer. This would establish dischordinate harmonics in the sound vibrations produced by these transducers because each transducer is responding to a different signal frequency and magnitude. This problem is overcome by having the transducer 22 supported in the transducer assembly housing 42 such that the transducer is completely insulated from transmitting any vibration to the housing itself or to the headband 10. This is accomplished by mounting the transducer 22 on a collar 44 resting on a shelf 46 in the housing 42. A sound-insulating pad 48 is provided between the collar 44 and shelf 46. The transducer 22 is further supported by a resilient coil spring 50 securely fastened to the transducer mounting collar 44 and engaging a foam rubber retaining pad 52 fastened by adhesive to the housing top end cover 54. The insulation 48 passes through an aperture in the shelf 46 acting as a guide for the oscillatable transducer 22.

Figure 5:
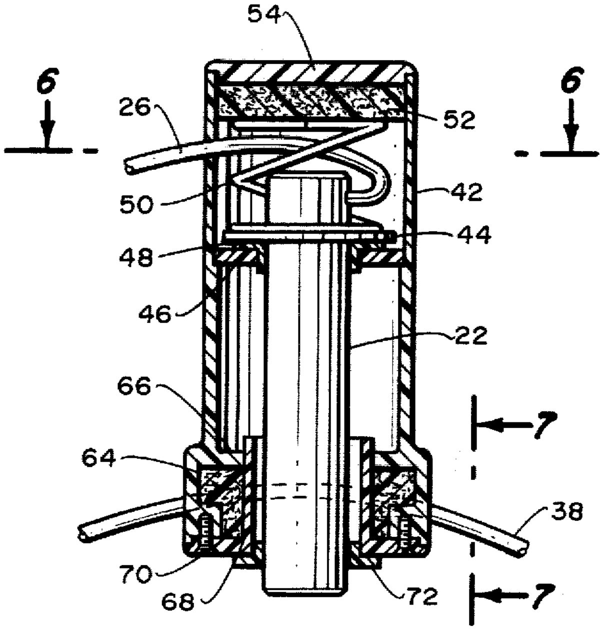
FIG. 5 is a sectional view taken at 5—5 of FIG. 4.
Figure 6:
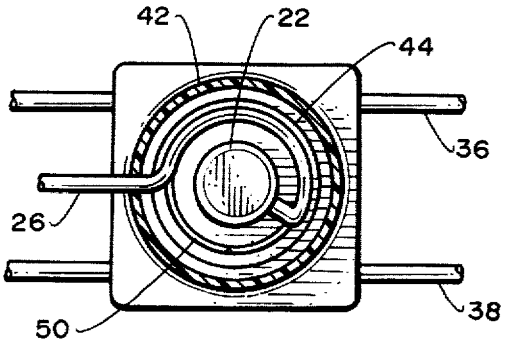
FIG. 6 is a sectional view taken at 6—6 of FIG. 5.
Figure 7:
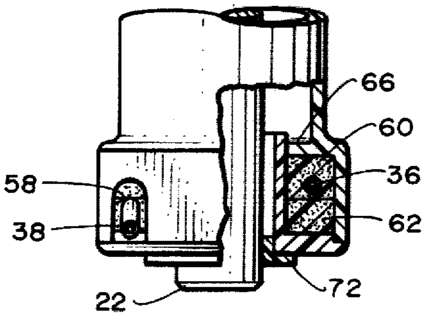
FIG. 7 is a partial section taken at 7—7 of FIG. 5.

Vibrations which could be conducted along the transducer interconnect cable 26 to the housing 42 are precluded by routing the cable in the manner shown in FIG. 5 forming a partial helix between its exit from the case of transducer 22 to the exit hole in the side of the housing 42. This manner of routing also prevents interference with the compression and extension of resilient coil spring 50. To further reduce the possibility of interference between the cable and spring, the spring is constructed with only one 360° convolution or coil.

To prevent any conduction of transducer vibrations from the housing 42 to the headband wires 36 and 38, the two parallel headband wires are routed through cutouts 58 in the housing 42 and sandwiching the wires between compressed foam rubber pads 60 and 62. The foam pads 60 and 62 are constructed to fit an annular cavity 64 at the bottom end of the housing 42. One pad 60 is positioned against the recessed internal flange 66 extending inwardly from the housing wall with the other pad 62 positioned around a tubular extension or sleeve 68 of the lower housing end cap 70 fastened securely to the housing by means of screws as shown. The tubular sleeve 68 prevents elongation of the pads 60 and 62 under compression and possible interference with the movement of the transducer 22. The lower end cap 70 and tubular sleeve or extension 68 provides a closure for the annular cavity 64 compressing and enclosing the foam pads 60 and 62 firmly around the wires 36 and 38 of the headband 10.

A foam insulating guide 72 is provided at the exit to the tubular sleeve 68 to maintain the spacing of the transducer 22 from the housing. To minimize conduction of vibrations to the point of contact of the transducer 22 and the isolation guides 72 and 48, the area of contact of the guides with the transducer 22 is minimized and the isolator guides constructed of soft foam rubber material.

When the entire headband and transducer assembly is firmly fitted in place on a person's head, each transducer assembly can be individually adjusted along the headband wires 36 and 38 by traversing the wires allowing them to slide through the compressed pads 60 and 62. This permits optimum positioning of the transducer assemblies on the head with the faces of the transducers 22 and 24 firmly pressed against the cranium or skull. The firm positioning of the headband causes compression to be exerted against the face of each transducer which exerts a force against the resilient coil spring 50, recessing the transducer within the housing 42. This longitudinal movement of the transducer unseats the transducer mounting collar 44 from the shelf 46 partially compressing the transducer resilient coil spring 50. The amount of pressure of the transducer against the skull and the distance the transducer is recessed is controlled by the strength of the coil spring 50.

Figure 3:
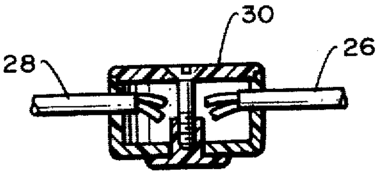
FIG. 3 is a sectional view taken at 3—3 of FIG. 2.
Figure 4:
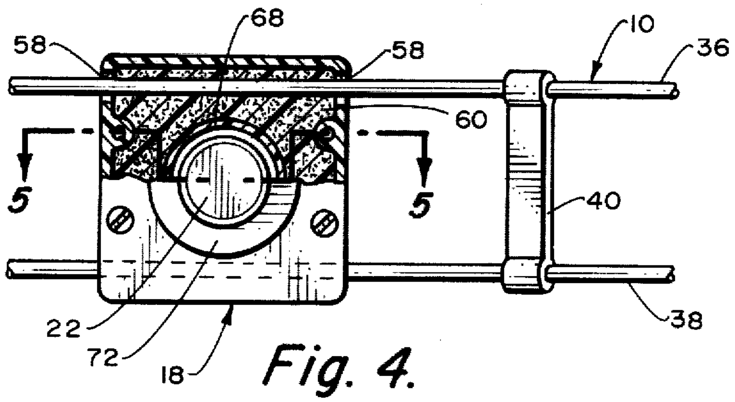
FIG. 4 is a view taken at 4—4 of FIG. 1 partially sectioned.

To utilize the intercranial transmitting apparatus shown, it is first positioned on the head as illustrated in FIG. 1. An external source of sound signals (i.e. signal generator, tape player, radio, stereo, etc.) is connected to the stereo plug 34 and used to produce the frequency and magnitude of the sound signal to the respective transmitters 22 and 24. The two-channel stereo connector plug 34, when connected to the external signal source, routes the signals through the main cable assembly 32 to the two separate transducer interconnecting cables 26 and 28 through the cable junction housing 30. One channel of the sound signal source is routed to one transducer assembly 18 and the second channel of sound signals is routed to the remaining transducer assembly 20. The cable junction housing 30 is secured to the two parallel headband wires by the cable housing screw assembly shown in FIG. 3, clamping the junction 30 firmly on the headband wires 36 and 38 which also assists in maintaining the distance between the two wires along with the plastic wire headband spacers 40.

The transducers 22 and 24 are constructed in accordance with the teachings of patent application Ser. No. 37,809, filed May 10, 1979, incorporated herein, by the same inventor as the invention shown and disclosed herein. The transducer is comprised of a tubular cylinder in which a permanent magnet is encased. The permanent magnet is surrounded by a non-magnetic tubular bobbin on which is wound a plurality of turns of wire affording a single continuous winding. The permanent magnet is secured inside the tubular bobbin by rubber retainers at each end and spaced from the bobbin by a liquid sheath. As was indicated, this transducer is disclosed and described in U.S. patent application mentioned above by the same inventor of the invention herein disclosed and described.

The windings in the transducer are grouped at each end of the non-magnetic tubular bobbin with the winding at one end reversed from the other end to create a given polarity, for example, north at the center of the bobbin and the opposite polarity, south, at each end of the bobbin. This arrangement enhances the conversion of electrical signals into acoustic vibrations. The space between the permanent magnet mounted in the tubular bobbin is filled with a liquid such as oil or a dry lubricant. The liquid reduces frictional contact and facilitates movement of the magnet in response to the signals from the electrical signal source.

The generated sound signal, upon reaching the transducer assembly, causes the transducer assembly to vibrate in a longitudinal direction within the transducer housing 42 in accordance with the frequency and magnitude of the incoming sound signal. This causes additional compression and extension of the partially compressed transducer pressure coil spring 50. These vibrations are transmitted to the cranial structure of a human being which in turn causes vibratile motion of the inner ear fluid surrounding the auditory air receptors and is subsequently converted to electrical energy and transmitted as nerve impulses to the brain where it is perceived as sound. Lateral movements of the vibrating transducer are controlled or minimized by the upper and lower isolator guides 48 and 72.

Obviously, many modifications and variations of the present invention are possible when considered in light of the above teachings. It is therefore to be understood that the full scope of the invention is not limited to the details disclosed herein and may be practiced otherwise than as specifically described.

What is claimed is:

1. Apparatus for intercranial transmission of a plurality of audio signals comprising:
   - a pair of independent transducer assemblies each having oscillatable transducers;
   - a headband conforming to the shape of the skull;
   - means for transmitting audio signals through the cranium and for mounting said transducer assemblies with the face of said oscillatable transducers pressed against the cranium;
   - said mounting means including adjusting wire means for sliding said transducer assemblies on said headband;
   - said adjusting means including means for insulating said transducer assemblies from said headband and each other; and
   - connecting means for independently connecting each of said oscillatable transducers to an audio signal source.

2. Apparatus for intercranial transmission of a plurality of audio signals comprising
   - a pair of independent transducer assemblies each having oscillatable transducers;
   - a headband conforming to the shape of the skull;
   - mounting means mounting said transducer assemblies with the face of said oscillatable transducers pressed against the cranium;
   - said mounting means including adjusting means for adjusting the position of said transducer means on said headband;
   - said adjusting means including means for insulating said transducer assemblies from said headband and each other; and
   - connecting means for separately connecting each of said oscillatable transducers to an audio signal source;
   - earmuffs attached to opposite ends of said headband, said earmuffs adapted to cover the ears and exclude external stimuli.

3. Apparatus for intercranial transmission of a plurality of audio signals comprising:
   - a pair of independent transducer assemblies, each having an oscillatable transducer and comprising a housing being enclosed at one end, support means supporting said oscillatable transducer in a spaced relationship from said housing, foam insulating means insulating said transducer from a closed end of said housing, resilient means resiliently urging said transducer into a position with one end extending out the other end of the housing into contact with the cranium;
   - a headband conforming to the shape of the skull;
   - mounting means mounting said transducer assemblies with the face of said oscillatable transducers pressed against the cranium;
   - said mounting means including adjusting means for adjusting the position ofsaid transducer means on said headband;
   - said adjusting means including means for insulating said transducer assemblies from said headband and each other; and
   - connecting means for separately connecting each of said oscillatable transducers to an audio signal source.

4. The apparatus in accordance with claim 3 wherein said support means comprises:
   - a shelf in said housing;
   - a collar on said transducer resting on said shelf;
   - insulating means on said shelf between the collar and the shelf.

5. The apparatus in accordance with claim 4 wherein said resilient means is between said collar and the foam insulating means at the closed end of said housing.

6. The apparatus in accordance with claim 5 wherein said resilient means is a coil spring having one end engaging the collar and the other end engaging the foam insulation at the closed end of said housing.

7. The apparatus in accordance with claim 6 wherein said coil spring has one 360° convolution.

8. The apparatus in accordance with claim 7 wherein the transducer connecting means passes through said housing and forms a partial helix before connecting to the transducer.

9. Apparatus for intercranial transmission of a plurality of audio signals comprising:
   - a pair of independent transducer assemblies, each having oscillatable transducers;
   - a headband conforming to the shape of the skull and comprising a pair of spaced-apart wires;
   - mounting means for mounting said transducer assemblies with the face of said oscillatable transducers pressed against the cranium, and including compressible foam means encapsulating said wires, said wires being slideable through said foam means for adjusting the position of said transducer assemblies on said headband;
   - said adjusting means including means for insulating said transducer assemblies from said headband and each other; and
   - connecting means for separately connecting each of said oscillatable transducers to an audio source.

10. Apparatus in accordance with claim 9 in which said oscillatable transducers are mounted in a housing;

said compressible foam means being in an annular cavity in said housing;

said housing having slots through which said wires pass.

11. The apparatus in accordance with claim 10 wherein:

said housing is cylindrical and is closed on one end;

support means supporting said transducer in a spaced insulated relationship from said housing;

resilient means resiliently urging said oscillatable transducer into an extended position with one end extending beyond the other end of said housing;

whereby when the face of said transducer contacts the cranium said transducer will be floating substantially free of said housing between the skull of the wearer and the resilient means.

12. The apparatus in accordance with claim 11 wherein said annular cavity is at the end of said housing from said closed end and is formed by an end cap having a tubular sleeve extending into said housing spaced from said transducer.

13. The apparatus in accordance with claim 12 including sound-insulating guides between said shelf and said tubular sleeve to maintain said transducer spaced from said housing.

14. The apparatus in accordance with claim 11 wherein said support means comprises:

a circular shelf in said housing;

a circular collar on said transducer resting on said shelf;

sound-insulating means on said shelf between said collar and said shelf;

a sound-insulating retaining pad at the closed end of said housing; and one end of said resilient means engaging said collar and the other end engaging said retaining pad.

15. The apparatus in accordance with claim 14 wherein said resilient means comprises a coil spring.

16. The apparatus in accordance with claim 15 wherein said coil spring has a single 360° convolution.

17. The apparatus in accordance with claim 16 wherein said connecting means includes:

a junction box cable housing secured to and spanning the two parallel headband wires;

a stereophonic plug connected to said junction box;

a pair of wires connecting each of said transducer assemblies independently to said junction box.

18. The apparatus in accordance with claim 17 wherein said wires pass through said housing and form a partial helix before being connected to said oscillatable transducers.

* * * * *